United States Patent

Nysen

Patent Number: 6,060,815
Date of Patent: *May 9, 2000

[54] FREQUENCY MIXING PASSIVE TRANSPONDER

[75] Inventor: Paul A. Nysen, Sunnyvale, Calif.

[73] Assignee: X-Cyte, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,455

[22] Filed: Aug. 18, 1997

[51] Int. Cl.$^7$ .................................................. G01S 15/00
[52] U.S. Cl. ............................................................ 310/318
[58] Field of Search .............................. 342/51; 310/318, 310/319

[56] References Cited

U.S. PATENT DOCUMENTS

| | | | |
|---|---|---|---|
| 2,817,012 | 12/1957 | Kendall | 246/124 |
| 3,025,524 | 3/1962 | Thies | 343/823 |
| 3,209,350 | 9/1965 | Davis et al. | 246/2 R |
| 3,273,146 | 9/1966 | Hurwitz | 342/51 |
| 3,513,470 | 5/1970 | Rabow | 342/51 |
| 3,521,280 | 7/1970 | Janco et al. | 73/290 V |
| 3,600,710 | 8/1971 | Adler | 333/72 |
| 3,665,480 | 5/1972 | Fassett | 343/754 |
| 3,689,929 | 9/1972 | Moody | 343/802 |
| 3,706,094 | 12/1972 | Cole et al. | 343/6.5 SS |
| 3,737,911 | 6/1973 | Sakuragi et al. | 343/6.5 SS |
| 3,755,803 | 8/1973 | Cole et al. | 340/280 |
| 3,801,935 | 4/1974 | Mitchell | 333/72 |
| 3,810,257 | 5/1974 | Jones et al. | 333/30 R |

(List continued on next page.)

FOREIGN PATENT DOCUMENTS

| | | | |
|---|---|---|---|
| B6661181 | 1/1980 | Australia | G01K 11/22 |
| B3400184 | 10/1984 | Australia | H04B 1/59 |
| 2189788 | 9/1987 | Australia | G07C 5/00 |
| 8900470 | 11/1989 | Australia | H03H 9/145 |
| 1228911 | 11/1987 | Canada | G01S 13/80 |
| 0513007 | 11/1990 | European Pat. Off. | H03H 9/02 |
| 2521290 | 5/1975 | Germany | H03H 9/145 |
| 2524571 | 6/1975 | Germany | H04B 7/15 |

(List continued on next page.)

OTHER PUBLICATIONS

Gopuk, William; Optical Probing Measurements of Surface Wave Generation and Reflection in Interdigital Transducers on LiNbO$_3$; Nov. 1980; pp. 341–354.

Cambiaggio, Edmond; Saw Reflection from Conducting Strips on LiNbO$_3$; Sep. 1979; pp. 340–344.

Williamson, R.C; Reflective Array Matched Filter for a 16–Pulse Radar Burst; pp. 1325–1329, Dec. 1975.

DeVries, Adrian; Reflection of a Surface Wave from Three Types of ID Transducers; pp. 280–285; Dec. 1972.

IEEE Transactions on Sonics and Ultrasonics; Jan. 1973; vol. SU–20, No. 1; pp. 42, 187, 204.

(List continued on next page.)

Primary Examiner—Thomas M. Dougherty
Attorney, Agent, or Firm—Milde, Hoffberg & Macklin, LLP

[57] ABSTRACT

A transponder device, receiving a plurality of waves having differing frequencies, and producing a wave, having a frequency differing from the plurality of received waves, having characteristic modifications, having a mixer, receiving at least two waves and producing a mixed wave having a frequency differing from the received plurality of waves; and a wave modifying device, producing a characteristically modified wave from an input wave, the mixer being interconnected with the wave modifying device to produce, from the received plurality of waves, an output which is both characteristically modified and at a frequency of the mixed wave. The device may include one or more antenna structures, and preferably produces a mixed wave which is then characteristically modified and emitted from the device. The wave modifying device is, for example, a semiconductor modulator or an acoustic wave device.

37 Claims, 4 Drawing Sheets

U.S. PATENT DOCUMENTS

| | | | |
|---|---|---|---|
| 3,845,420 | 10/1974 | Holland et al. | 333/30 R |
| 3,845,490 | 10/1974 | Manwarren et al. | 343/821 |
| 3,869,682 | 3/1975 | Heeks et al. | 332/11 R |
| 3,870,994 | 3/1975 | McCormick et al. | 343/6.5 R |
| 3,878,528 | 4/1975 | Majeau | 343/6.5 SS |
| 3,889,258 | 6/1975 | Holmes et al. | 343/6.5 LC |
| 3,898,592 | 8/1975 | Solie | 333/72 |
| 3,909,838 | 9/1975 | Beyerlein | 357/70 |
| 3,931,597 | 1/1976 | Cho et al. | 333/30 R |
| 3,936,774 | 2/1976 | Mellon et al. | 333/30 R |
| 3,939,463 | 2/1976 | Kelly et al. | 340/3 E |
| 3,961,290 | 6/1976 | Moore | 333/30 R |
| 3,981,011 | 9/1976 | Bell, III | 343/6.5 LC |
| 4,001,691 | 1/1977 | Gruenberg | 325/14 |
| 4,003,073 | 1/1977 | Helda et al. | 357/70 |
| 4,023,167 | 5/1977 | Wahlstrom | 343/6.5 SS |
| 4,028,649 | 6/1977 | Komatsu et al. | 333/72 |
| 4,042,926 | 8/1977 | Anderson et al. | 343/17.7 |
| 4,044,355 | 8/1977 | Edvardsson | 343/14 |
| 4,058,217 | 11/1977 | Vaughan et al. | 209/74 M |
| 4,059,831 | 11/1977 | Epstein | 343/6.8 R |
| 4,069,472 | 1/1978 | Kamata et al. | 340/146.3 K |
| 4,072,915 | 2/1978 | Mitchell | 333/72 |
| 4,096,477 | 6/1978 | Epstein et al. | 343/6.5 SS |
| 4,106,020 | 8/1978 | Johnson | 343/14 |
| 4,110,653 | 8/1978 | Hartemann | 310/313 |
| 4,138,681 | 2/1979 | Davidson et al. | 343/702 |
| 4,141,712 | 2/1979 | Rogers | 65/36 |
| 4,143,340 | 3/1979 | Hunsinger | 333/151 |
| 4,151,525 | 4/1979 | Strauch et al. | 343/6.5 R |
| 4,155,056 | 5/1979 | Cross et al. | 333/195 |
| 4,166,258 | 8/1979 | Tseng | 333/195 |
| 4,180,815 | 12/1979 | Hill | 343/6.5 R |
| 4,201,964 | 5/1980 | Noro et al. | 333/151 |
| 4,213,104 | 7/1980 | Cullen et al. | 333/150 |
| 4,217,564 | 8/1980 | Autran | 333/152 |
| 4,218,680 | 8/1980 | Kennedy | 343/6.8 R |
| 4,234,666 | 11/1980 | Gursky | 428/573 |
| 4,241,352 | 12/1980 | Alspaugh et al. | 343/700 MS |
| 4,242,671 | 12/1980 | Plows | 340/572 |
| 4,242,685 | 12/1980 | Sanford | 343/770 |
| 4,259,673 | 3/1981 | Guretzky | 343/825 |
| 4,260,988 | 4/1981 | Yanagisawa et al. | 343/700 MS |
| 4,263,571 | 4/1981 | Kinoshita et al. | 333/194 |
| 4,263,595 | 4/1981 | Vogel | 343/6.5 SS |
| 4,267,534 | 5/1981 | Tanski | 333/153 |
| 4,288,343 | 9/1981 | Louderback | 252/408 |
| 4,288,689 | 9/1981 | Lemelson et al. | 235/435 |
| 4,297,701 | 10/1981 | Henriques | 343/6.5 LC |
| 4,307,356 | 12/1981 | Arai | 333/194 |
| 4,320,402 | 3/1982 | Bowen | 343/700 MS |
| 4,330,790 | 5/1982 | Burns | 357/70 |
| 4,331,740 | 5/1982 | Burns | 428/572 |
| 4,339,753 | 7/1982 | Mawhinney | 343/6.5 SS |
| 4,388,524 | 6/1983 | Walton | 235/380 |
| 4,400,702 | 8/1983 | Tanaka | 343/790 |
| 4,410,823 | 10/1983 | Miller et al. | 310/313 D |
| 4,422,055 | 12/1983 | Cullen et al. | 333/151 |
| 4,423,392 | 12/1983 | Wolfson | 333/116 |
| 4,434,383 | 2/1984 | Cho et al. | 310/313 R |
| 4,462,011 | 7/1984 | Ward | 333/154 |
| 4,477,813 | 10/1984 | Weiss | 343/700 MS |
| 4,480,150 | 10/1984 | Jones et al. | 174/52 FP |
| 4,484,160 | 11/1984 | Riha | 333/195 |
| 4,494,031 | 1/1985 | Barnes et al. | 310/313 B |
| 4,554,549 | 11/1985 | Fassett et al. | 343/700 MS |
| 4,589,422 | 5/1986 | James et al. | 128/804 |
| 4,604,623 | 8/1986 | Skeie | 343/6.8 R |
| 4,605,929 | 8/1986 | Skeie | 343/6.8 R |
| 4,620,191 | 10/1986 | Skeie | 342/51 |
| 4,623,890 | 11/1986 | Nysen | 342/44 |
| 4,625,184 | 11/1986 | Niitsuma et al. | 333/150 |
| 4,625,207 | 11/1986 | Skeie | 342/51 |
| 4,625,208 | 11/1986 | Skeie et al. | 342/51 |
| 4,642,640 | 2/1987 | Woolsey et al. | 342/42 |
| 4,644,384 | 2/1987 | Charoensakvirochana | 357/74 |
| 4,672,418 | 6/1987 | Moran et al. | 357/70 |
| 4,699,682 | 10/1987 | Takishima | 156/292 |
| 4,703,327 | 10/1987 | Rossetti et al. | 342/44 |
| 4,706,105 | 11/1987 | Masuda et al. | 357/74 |
| 4,724,443 | 2/1988 | Nysen | 343/700 MS |
| 4,725,841 | 2/1988 | Nysen et al. | 342/44 |
| 4,734,698 | 3/1988 | Nysen et al. | 342/44 |
| 4,737,789 | 4/1988 | Nysen | 342/51 |
| 4,737,790 | 4/1988 | Skeie et al. | 342/51 |
| 4,739,328 | 4/1988 | Koelle et al. | 342/44 |
| 4,745,401 | 5/1988 | Montean | 340/572 |
| 4,782,345 | 11/1988 | Landt | 343/727 |
| 4,786,907 | 11/1988 | Koelle | 342/51 |
| 4,800,392 | 1/1989 | Garay et al. | 343/700 MS |
| 4,802,216 | 1/1989 | Irwin et al. | 380/23 |
| 4,816,839 | 3/1989 | Landt | 343/795 |
| 4,845,397 | 7/1989 | Herrick et al. | 310/348 |
| 4,853,705 | 8/1989 | Landt | 343/803 |
| 4,864,158 | 9/1989 | Koelle et al. | 307/231 |
| 4,888,591 | 12/1989 | Landt et al. | 342/44 |
| 4,910,521 | 3/1990 | Mellon | 342/45 |
| 4,912,471 | 3/1990 | Tyburski et al. | 342/42 |
| 4,931,664 | 6/1990 | Knoll | 307/10.3 |
| 4,933,588 | 6/1990 | Greer | 310/313 D |
| 4,942,393 | 7/1990 | Waraksa et al. | 340/825.72 |
| 4,951,057 | 8/1990 | Nagel | 342/51 |
| 4,999,636 | 3/1991 | Landt et al. | 342/90 |
| 5,019,815 | 5/1991 | Lemelson et al. | 340/933 |
| 5,027,107 | 6/1991 | Matsuno et al. | 340/572 |
| 5,030,807 | 7/1991 | Landt et al. | 235/375 |
| 5,055,659 | 10/1991 | Hendrick et al. | 235/439 |
| 5,095,240 | 3/1992 | Nysen et al. | 310/313 R |
| 5,144,313 | 9/1992 | Kirknes | 342/44 |
| 5,182,570 | 1/1993 | Nysen et al. | 343/795 |
| 5,453,748 | 9/1995 | Lindell | 342/51 |
| 5,481,262 | 1/1996 | Urbas et al. | 340/870.17 |
| 5,488,379 | 1/1996 | Jackson et al. | 342/359 |
| 5,596,326 | 1/1997 | Fitts | 342/30 |
| 5,613,197 | 3/1997 | Copeland et al. | 455/22 |
| 5,654,693 | 8/1997 | Cocita | 340/572 |
| 5,697,091 | 12/1997 | Hirschenberger et al. | 455/318 |
| 5,721,783 | 2/1998 | Anderson | 381/68.6 |
| 5,734,332 | 3/1998 | Kirknes | 340/825.54 |
| 5,761,615 | 6/1998 | Jaffee | 455/314 |
| 5,862,456 | 1/1999 | Bode et al. | 455/73 |

FOREIGN PATENT DOCUMENTS

| | | | |
|---|---|---|---|
| 2604105 | 2/1976 | Germany | H03H 9/145 |
| 2813753 | 3/1978 | Germany | G01S 9/56 |
| 0089617 | 3/1983 | Germany | H03H 9/145 |
| 3438051 | 10/1984 | Germany | G01S 13/74 |
| 847909 | 6/1985 | South Africa . | |
| 847910 | 6/1985 | South Africa . | |
| 1298381 | 2/1969 | United Kingdom . | |
| 1413486 | 12/1972 | United Kingdom | H03B 5/32 |
| 2165411 | 10/1984 | United Kingdom | H03H 9/42 |
| 2165423 | 10/1984 | United Kingdom | H04B 1/59 |
| 2165425 | 10/1984 | United Kingdom | H03B 23/00 |
| 2142475 | 1/1985 | United Kingdom | H01Q 1/38 |

OTHER PUBLICATIONS

Haydl, William; Surface Acoustic Wave Resonators, Nov. 1976.

Cross, Peter S; Surface–Acoustic–Wave Resonators; Dec. 1981.

Stocker, Helmut; Akustische Oberflachenwellen–Bauelemente; Sep. 1984.

Williamson, Richard; Reflection Grating Filters; Department of the Army, pp. 381–442, Aug. 1997.

Holland, Melvin; Practical Surface Acoustic Wave Devices; Proceedings of the IEEE vol. 62, No. 5, May 1974; p 582–611.

Omnidirectional Antennas; Butterworth & Co; Chapter 2; pp 25–33; Dec. 1979.

Keenan, Robert; Private Firm Profits from Electronic Tolls; May 1996; Wireless Systems Design; p. 24.

Technology a Generation Ahead; Amtech Brochure; pp. 1–8, Insert; Dec. 1997.

Allan, Roger; Wireless Transceiver with Micromachined Sensor Detects Both Tire Pressure and Temperature; Technology Advances; Electronic Design; Dec. 16, 1996.

Walker, Harold; VPSk Modulation Transmits Digital Audio at 15 b/s/Hz; Wireless Systems Design; Dec. 1996; pp 38–42.

Grossmann, John; The Wiring of the Green; Inc. Technology, Apr. 1996, No. 4; pp 55–58.

A Spread Spectrum Chip for RIC Applications; Micron Communications Inc; Microwave Journal; Nov. 1996; pp 144–148.

Tuttle, John; Integrated Circuit Simplifies Design of RFID Systems; Microwaves & RF; Oct. 1996, pp 103–109.

Gud, Yan Peng; If Transceiver Serves Digital Cellular/PCS; Microwaves & RF; Oct. 1996, pp 77–84.

Robinson, Gail; Impulse Radar MicroPowered for Sensor Apps; EET; Jan. 20, 1997; pp 33–36.

Schreier, Paul; Technology Regs Dictate Multiple Decisions for Wireless Links; Personal Engineering; Feb. 1997; pp 29–39.

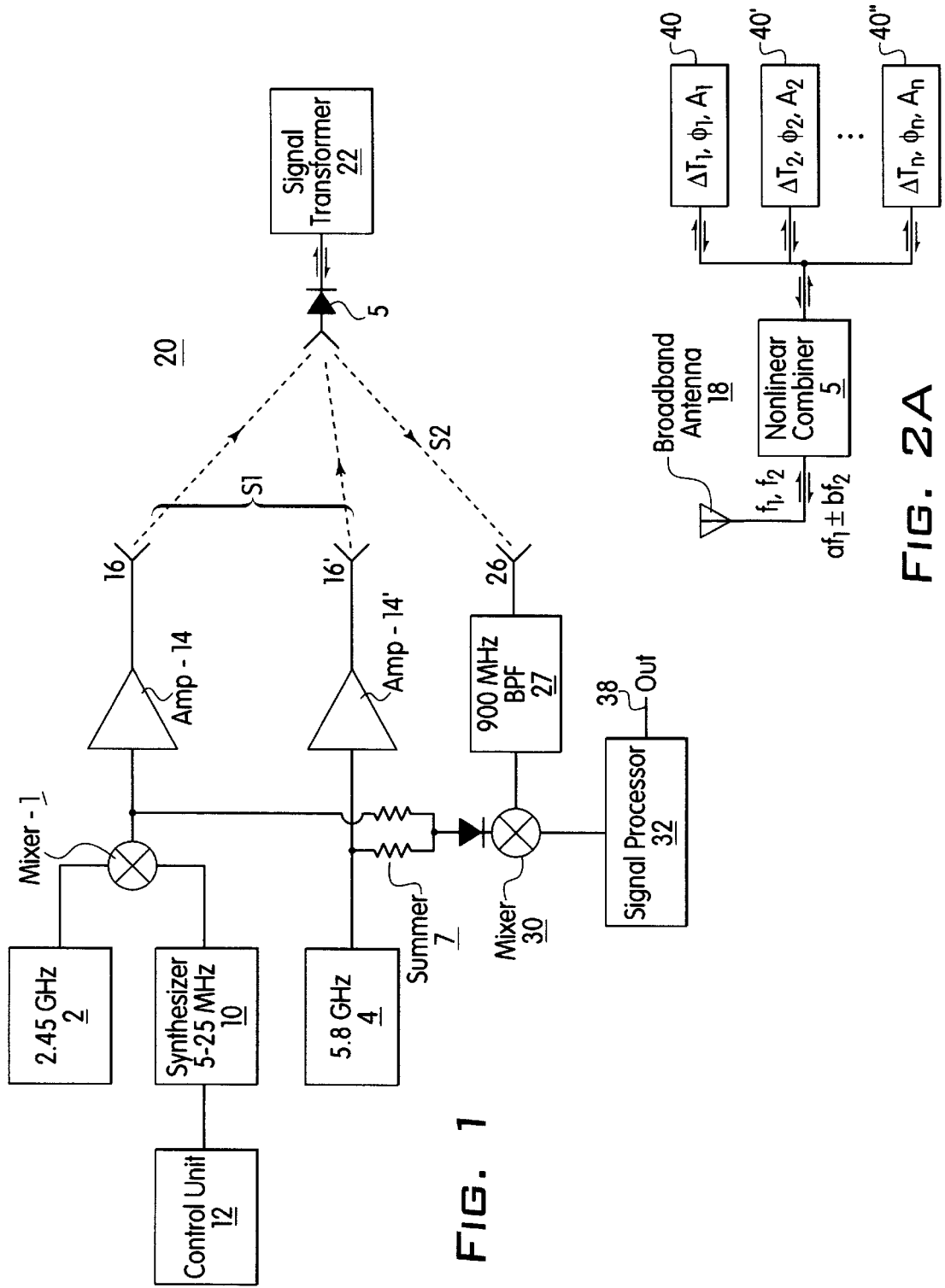

FREQUENCY MIXING PASSIVE TRANSPONDER

FIELD OF THE INVENTION

The present invention relates to a radio frequency identification technique and a system and method for radio frequency identification, and more particularly to a transponder which passively emits an information signal at a radio frequency being a non-harmonic different frequency from an interrogation radio wave.

BACKGROUND OF THE INVENTION

There are a number of radio frequency identification techniques known. The present invention relates to a transponder system which receives an interrogation radio wave, and passively emits radio waves derived from the interrogation radio wave, modulated with information from the transponder. These systems typically operate according to one of two principles: a modulated backscatter based on a sequential alteration in antenna impedance; and an "echo" pattern of the interrogation beam consisting of a characteristic transfer function having a set of internal delays.

Many known systems employ the 915 MHz band (about 905–925 MHz), which was made available by regulations in much of the world, including the U.S. Presently, however, users are being encouraged to migrate to different bands. Further, in sensing an echo pattern of a passive acoustic transponder device, typically the interrogation radio wave is made non-stationary, for example in a chirp waveform. These chirp techniques are also being discouraged by regulation. The first type of RF-ID transponder tag includes an electronic circuit, e.g., CMOS, to store digital ID data which is then modulated onto a received signal by means of an RF circuit, e.g., a GaAs MESFET, transistor or controlled diode. Power for the data storage and modulating circuit may be derived from an interrogating RF beam or another power source, such as a battery, and the backscatter emission is also derived from the beam. In this type of system, the interrogating RF beam is generally of fixed frequency or direct sequence spread spectrum (See, U.S. Pat. No. 4,888,591, expressly incorporated herein by reference), with the resulting modulated signal at the same carrier frequency, with AM, FM, PSK, QAM or another known modulation scheme employed. In order to provide separation between the received and transmitted signals, the modulated output may be, for example, transmitted as a harmonic of the interrogating RF beam. Such a system is disclosed in U.S. Pat. No. 4,739,328, expressly incorporated herein by reference.

A second type of RF-ID tag includes a passive acoustic wave device, in which an identification code is provided as a characteristic time-domain reflection pattern in a retransmitted signal, in a system which generally requires that the signal emitted from an exciting antenna be non-stationary with respect to a signal received from the tag. This ensures that the reflected signal pattern is distinguished from the emitted signal. In such a device, received RF energy, possibly with harmonic conversion, is emitted onto a piezoelectric substrate as an acoustic wave with a first interdigital electrode system, from whence it travels through the substrate, interacting with reflector elements in the path of the wave, and a portion of the acoustic wave is ultimately received by the interdigital electrode system and retransmitted. These devices do not require a semiconductor memory. The propagation velocity of an acoustic wave in a surface acoustic wave device is slow as compared to the free space propagation velocity of a radio wave. Thus, assuming that the time for transmission between the radio frequency interrogation system is short as compared to the acoustic delay, the interrogation frequency should change such that a return signal having a minimum delay may be distinguished, and the interrogation frequency should not return to that frequency for a period longer than the maximum acoustic delay period. Generally, such systems are interrogated with a pulse transmitter or chirp frequency system.

Because the encoded information normally includes an identification code which is unique or quasi-unique to each transponder, and because the transponders of this type are relatively light weight and small and may be easily attached to other objects to be identified, the transponders are sometimes referred to as "labels" or "tags". The entire system, including the interrogator/receiver apparatus and one or more transponders, which may be active or passive, is therefore often referred to as a "passive interrogator label system" or "PILS".

In its simplest form, the acoustic wave RF-ID transponder systems include a radio frequency transmitter capable of transmitting RF pulses of electromagnetic energy. These pulses are received at the antenna of a passive transponder and applied to a piezoelectric "launch" transducer adapted to convert the electrical energy received from the antenna into acoustic wave energy in the piezoelectric material. Upon receipt of a pulse, an acoustic wave is generated within the piezoelectric material and transmitted along a defined acoustic path. This acoustic wave may be modified along its path, such as by reflection, attenuation, variable delay, and interaction with other transducers.

When an acoustic wave pulse is reconverted into an electrical signal it is supplied to an antenna on the transponder, which may be the same antenna which receives the interrogation wave or a different antenna, and transmitted as RF electromagnetic energy. This energy is received at a receiver, preferably at or near the same location as the interrogating transmitter, and the information contained in this response to an interrogation is decoded.

In systems of this general type, the information code associated with and which identifies the passive transponder is built into the transponder at the time that a layer of metallization is fully defined on the substrate of piezoelectric material. This metallization also defines the antenna coupling, launch transducers, acoustic pathways and information code elements, e.g., reflectors and phase delays. Thus, the information code in this case is non-volatile and permanent. The information is present in the return signal as a set of characteristic perturbations of the interrogation signal, such as delay and specific attenuation pattern. In the case of a tag having launch transducers and a variable pattern of reflective elements, the number of possible codes is $N \times 2^M$ where N is the number of acoustic waves (paths) launched by the transducers and M is the number of variable (reflective and/or delay) element positions for each transducer. Thus, with four launch transducers each emitting two acoustic waves, and a potential set of eight variable reflective elements in each acoustic path, the number of differently coded transducers is $4^8 = 2048$. Therefore, for a large number of potential codes, it is necessary to provide a large number of launch transducers and/or a large number of reflective elements. However, efficiency is lost with increasing complexity, and a large number of distinct acoustic waves reduces the signal strength of the signal encoding the information in each.

The passive acoustic transponder tag thus includes a multiplicity of "signal conditioning elements", i.e., delay elements, reflectors, and/or amplitude modulators, coupled to receive the first signal from a transponder antenna. Each signal conditioning element provides an intermediate signal having a known delay and a known amplitude modification to the first signal. Typically, the signals representing each of multiple acoustic paths are recombined for transmission through a single antenna in a signal combining element, to produce the second signal. As described above, the signal modification elements and/or the signal combining element impart a known, unique informational code to the second signal. A receiver, generally positioned proximate to the interrogator, received the reply signal and processes the information to determine the coding of the passive acoustic transponder. Because the frequency of the interrogation signal changes over time, the received response of the tag, delayed and/or reflected due to the internal structures, is generally at a different frequency than the simultaneously emitted signal, thus distinguishing the interrogation signal from the reply signal.

The passive acoustic transponder receiving and decoding apparatus in a known system receives the reply signal from the transponder and mixes the reply signal with a representation of the interrogation signal in a four quadrant mixer, producing as an output a signal containing the difference frequencies (or frequencies derived from the difference frequencies) of the interrogation and reply signals, respectively. A signal processor detects the phases and amplitudes of the respective difference frequencies to determine the informational code associated with the interrogated transponder. Where the code is provided as a set of time delays, the signal processor performs a time-to-frequency transform (Fourier transform) on the received signal, to assist in determination of the various delay parameters. The nominal, known delay times provided in the transponder consist of a common, nominal, known delay $T_0$ for a group of the signal delay means (reflectors), plus nominal, known differences in delay time ($\Delta T_1, \Delta T_2 \ldots \Delta T_i$) between intermediate signals produced by chronologically successive ones of the signal delay elements in the group. In order to calculate the time delays from received reflection or echo patterns, a frequency analysis or time-frequency transform, e.g., Fourier transform, is performed, which converts the set of time mapped data into frequency/phase mapped data. The characteristic delays of the transducer then appear in the transformed data set at the receiver as signal energy having a time delay. Alternately, a set of matched filters may be implemented, and the outputs analyzed.

Systems for interrogating a passive transponder employing acoustic wave devices, carrying amplitude and/or phase-encoded information are disclosed in, for example, U.S. Pat. Nos. 4,059,831; 4,484,160; 4,604,623; 4,605,929; 4,620,191; 4,623,890; 4,625,207; 4,625,208; 4,703,327; 4,724,443; 4,725,841; 4,734,698; 4,737,789; 4,737,790; 4,951,057; 5,095,240; and 5,182,570, expressly incorporated herein by reference. Other passive interrogator label systems are disclosed in the U.S. Pat. Nos. 3,273,146; 3,706,094; 3,755,803; and 4,058,217. The following references are hereby expressly incorporated by reference for their disclosure of RF modulation techniques, transponder systems, information encoding schemes, transponder antenna and transceiver systems, excitation/interrogation systems, and applications of such systems: U.S. Pat. Nos. 2,193,102; 2,602,160; 2,774,060; 2,943,189; 2,986,631; 3,025,516; 3,090,042; 3,206,746; 3,270,338; 3,283,260; 3,379,992; 3,412,334; 3,480,951; 3,480,952; 3,500,399; 3,518,415; 3,566,315; 3,602,881; 3,631,484; 3,632,876; 3,699,479; 3,713,148; 3,718,899; 3,728,632; 3,754,250; 3,798,641; 3,798,642; 3,801,911; 3,839,717; 3,859,624; 3,878,528; 3,887,925; 3,914,762; 3,927,389; 3,938,146; 3,944,928; 3,964,024; 3,980,960; 3,984,835; 4,001,834; 4,019,181; 4,038,653; 4,042,906; 4,067,016; 4,068,211; 4,068,232; 4,069,472; 4,075,632; 4,086,504; 4,114,151; 4,123,754; 4,135,191; 4,169,264; 4,197,502; 4,207,518; 4,209,785; 4,218,680; 4,242,661; 4,287,596; 4,298,878; 4,303,904; 4,313,118; 4,322,686; 4,328,495; 4,333,078; 4,338,587; 4,345,253; 4,358,765; 4,360,810; 4,364,043; 4,370,653; 4,370,653; 4,388,524; 4,390,880; 4,471,216; 4,472,717; 4,473,851; 4,498,085; 4,546,241; 4,549,075; 4,550,444; 4,551,725; 4,555,618; 4,573,056; 4,599,736; 4,604,622; 4,605,012; 4,617,677; 4,627,075; 4,641,374; 4,647,849; 4,654,512; 4,658,263; 4,739,328; 4,740,792; 4,759,063; 4,782,345; 4,786,907; 4,791,283; 4,795,898; 4,798,322; 4,799,059; 4,816,839; 4,835,377; 4,849,615; 4,853,705; 4,864,158; 4,870,419; 4,870,604; 4,877,501; 4,888,591; 4,912,471; 4,926,480; 4,937,581; 4,951,049; 4,955,038; 4,999,636; 5,030,807; 5,055,659; 5,086,389; 5,109,152; 5,131,039; 5,144,553; 5,163,098; 5,193,114; 5,193,210; 5,310,999; 5,479,160; and 5,485,520. In addition, foreign patents CH346388; DE1295424; DE2926836; DE969289; EP0207020; FR2260115; GB1130050; GB1168509; GB1187130; GB2103408; GB2247096; GB774797; GB987868; JP0138447; JP0189467; JP116054; JP5927278; and NE1566716. The following references are also of interest: "IBM Technical Disclosure Bulletin", (vol. 20, No. 7; 12/77), pp. 2525–2526.; "IEEE Transactions on Vehicular Technology", (vol. VT-26, No. 1), 2/77; p. 35.; A. R. Koelle et al. "Short-Range Radio-Telemetry for Electronic Identification using Modulated RF Backscatter", by A. (Proc. of IEEE, 8/75; pp. 1260–1261).; Baldwin et al., "Electronic Animal . . . Monitoring", 1973.; Electronic Letters, December 1975, vol. 11, pp. 642–643.; Encyclopedia of Science and Technology; vol. 8, pp. 644–647 (1982).; Federal Information Processing Standards Publication 4A, Jan. 15, 1977, Specifications for the Data Encryption Standard.; IEEE Transactions, Henoch et al., vol. MTTT-19, No. 1, January 1971.; IEEE Transactions, Jaffe et al., pp. 371–378, May 1965.; IRE Transactions, Harrington, pp. 165–174, May 1962.; IRE Transactions, Rutz, pp. 158–161, March 1961.; J. Lenk, Handbook of Microprocessors, Microcomputers and Minicomputers; p. 51 (1979).; Koelle et al., "Electronic Identification . . . Monitoring", 7/73 to 6/74, pp. 1–5.; P. Lorrain et al., EM Fields and Waves; Appendix A, (1970).; Proceedings of IRE, March 1961, pp. 634–635; RCA Review, vol. 34, 12/73, Klensch et al., pp. 566–579.; RCA Review, Sterzer, 6/74, vol. 35, pp. 167–175.; Reports on Research, September–October 1977, vol. 5, No. 2.

Signal mixers are well known structures. These devices typically employ a non-linear element which intermodulates concurrent signals. This non-linear element may be as simple as a diode, or a more complex device.

SUMMARY OF THE INVENTION

The present invention provides a method and apparatus for interrogating an RF-ID device, of any internal construction, which regenerates an encoded output wave based on received interrogation wave energy, wherein a plurality of interrogation waves are mixed in the RF-ID device and the regenerated wave is derived from the mixed received waves. Typically, the mixed received waves are modified or encoded by an internal component of the RF-ID tag, and then regenerated. The mixed received wave in such a case is different from and non-harmonically related to any of the interrogation waves. In this way, the active signal emission components of the system may be at different frequencies than the internal components of the RF-ID tag and/or the regenerated signal, respectively. For example, regulations may preclude transmission of an interrogation signal in a particular band, but allow a regenerated signal to be emitted in that band.

It is understood that, according to the invention, signals having different frequencies may be emitted or received through a common antenna, or through separate antennas, as desired, and that the RF-ID tag may employ one or more antennas for different signals. Therefore, it is understood that the below-described embodiment are exemplary, and are to be interpreted to include various antenna arrangements. Further, the present invention is intended to operate with the various types of RF-ID signal encoding methodologies, such as acoustic, semiconductor memory, and the like, and therefore the encoding methodology of the below embodiments should not be considered limiting.

According to one embodiment of the invention, the interrogation wave is a set of radio frequency emission which, when mixed, result in a 915 MHz band component, which is then modulated or encoded and regenerated, e.g., retransmitted or backscattered in known manner, for example in a known semiconductor RF-ID transponder device or an acoustic transponder device. Useful sets of interrogation frequencies for receiving a reply in the 915 MHz band include, but are not limited to: 2450 MHZ and 5800 MHz; 5800 MHz and 3350 MHz; 2450 MHz and 3350 MHz; 1,000 MHz and 1,900 MHz; 1,600 MHz and 4,100 MHz. Typically, the preferred sets of frequencies include two different frequencies which have a sum or difference of the frequency or a first harmonic of the frequency which yields the desired frequency. Typically, these frequencies reside in bands which are available for unlicensed use at sufficient power levels to receive information from the tag over a desired distance, for example 3–30 feet. The 915 MHz signal is then modified or encoded, and regenerated and received by a receiver.

In this system, one or more frequency interrogation waves are emitted, without intermodulation, possibly emitted by different antennas. The waves are received by the remote radio frequency identification device, through one or more antennas. The received radio frequency waves are then non-linearly combined, e.g., mixed, to generate a component in a desired band, which is not present in the transmitted signal. This component is then modified or encoded by the RF-ID transponder device in known manner and regenerated as a reply signal. It is noted that, in the regeneration process, the modified or encoded representation of the signal may again be mixed with one or more of the interrogation signals to allow transmission on yet another frequency. In fact, the regenerated transmission may be at one of the interrogation frequencies.

The mixer is typically a semiconductor device, placed within the circuit to efficiently mix the received signals. The semiconductor device may also serve to couple the received energy to the signal modulator. While a preferred embodiment mixed the received signals prior to modulation, it is also possible to modulate the signals prior to mixing, and/or to mix the signals before and after modulation.

While the mixer does not transfer all of the received signal power in the desired band, the use of interrogation signals from multiple sources at differing frequencies allows a net interrogation signal power sufficient to excite the transponder and produce a suitable reply signal, i.e., regenerated wave.

The mixer may be, for example, a semiconductor diode-device fed by portions of a microstrip antenna. Since the mixed waves have different wavelengths than the unmixed waves, a separate antenna may be used to transmit the regenerated reply signal. Further, where the interrogation waves differ substantially in wavelength, separate antenna structures may be used for different signals, e.g., one antenna for each wavelength.

In a known radio frequency identification transponder device, the device operates in the 915 MHz band, on a third harmonic of a resonant frequency design parameter of about 305 MHz. According to the present invention, therefore, the mixed received signal may have a component at 305 MHz, allowing the transponder device to operate at its fundamental frequency. The device may then retransmit the 305 MHz wave, or this same wave may be subject to the mixer to produce a regenerated signal at a different frequency. This later transformation is advantageous where, for example, the antenna is relatively poor at 305 MHz and better at another frequency available by mixing the available signals.

In the acoustic wave transponder device, the interrogation signals, comprising a plurality of waves having different frequencies, are received by a broadband antenna or a set of antenna elements, adapted for receiving portions of the interrogation signals. The received plurality of waves are then either mixed to produce a mixed signal, having at least one component having a frequency different than the received plurality of waves, and subsequently subjected to the acoustic device, or one or more signal components subjected to the acoustic device and then mixed with other signals. In either case, the transponder produces a modified signal having a frequency different from the interrogation signals.

The mixer is, for example, a Schottky diode or GaAs device, which efficiently produces mixed signal components, harmonics of components, and mixed harmonics of components. The mixer may interact with the acoustic device to form a resonant structure, and indeed the mixer may be integral to the acoustic device.

According to still another feature of the present invention, the transducer of is constructed to closely match the impedance of the dipole antenna of the transponder and diode mixer to which it is connected. This impedance match maximizes the transfer of energy between the radiation transmitted to and from the antenna and the acoustic energy within the SAW device. The impedance of a SAW transducer comprises a relatively large capacitance created by its interdigital fingers plus a small ohmic resistance. With a conventional transducer, this capacitance is several times greater than the reactive impedance (inductance and capacitance) of a microwave dipole antenna designed to operate a 915 MHz. The addition of the diode mixer structure provides increased impedance over a corresponding system without this structure. It is also possible to provide a pair of antennas, each tuned to one of the interrogation waves. The higher frequency receiving antenna, however, will typically have a lower reactive impedance. In order provide a matched impedance between the antenna, mixer and acoustic wave device, "complex conjugate" matching is employed, so that the reactive components in the impedance of the antenna(s), mixer and the transducers substantially cancel each other. For example, the normal capacitance of an interdigital transducer is greater than the reactive impedance of the antenna. Lowering the effective impedance of the transducer may be accomplished by constructing each transducer as two serially connected partial transducers. Likewise, the capacitance may be raised by providing parallel arrangements or mixed series and parallel arrangements.

The acoustic device converts an input signal into a modified output signal, encoded with an information pattern. The information pattern is encoded as a series of elements having characteristic delay periods $T_0$ and $\Delta T_1, \Delta T_2, \ldots \Delta T_N$. Two common types of signal transforming systems exist, and either may be employed. In a first, the delay periods correspond to physical delays in the propagation of the acoustic signal. After passing each successive delay, a portion of the signal $I_0, I_1, I_2 \ldots I_N$ is tapped off and supplied to a summing element. The resulting modified signal, which is the sum of the intermediate signals $I_0 \ldots I_N$, is fed back to a transponder tag antenna, which may be the same or different than the antenna which received the interrogation signal, for transmission to the interrogator/receiver antenna. In a second system, the delay periods correspond to the positions of reflective elements, which reflect portions of the acoustic wave back to the launch transducer, where they are converted back to an electrical signal and emitted by the transponder tag antenna.

Therefore, the present invention relieves the need for the interrogation beam generator, transponder device and receiver to each operate on the same frequency, allowing, to some degree, versatility in the selection of such frequencies. Therefore, efficient or advantageous design parameters may be selected for the differing system components with greater flexibility, without requiring active signal generation by the RF-ID transponder.

Because the system requires that the multiple interrogation frequencies be present to allow mixing to yield the desired frequency, this allows spatial discrimination of transponders within a composite interrogation field. In other words, multiple zones may be created by a patchwork of irradiation with differing frequencies. Only where the non-linear combination of the frequencies yields a signal in the desired band will the output be detected, and multiple closely spaced non-interfering zones may be constructed.

Another advantage of the present invention is that, assuming broad band antenna design, the internal RF-ID transponder design does not dictate the interrogation frequencies, and these frequencies may vary by programming or modifying the interrogation device without altering the RF-ID transponders. In the case of interference, the interrogation device may select different interrogation parameters.

Where the modified or encoded signal from the RF-ID transponder device is mixed with the interrogation waves, multiple representations of the modified or encoded signal will be transmitted by the transponder. This allows reception of one or more of these waves, and analysis of the differing signals to detect or reduce errors.

The present invention also provides a composite antenna structure for receiving signals at differing microwave frequencies, mixing the signals, and coupling the signals to a signal modification device. This antenna system comprises a microstrip or patch antenna having omnidirectional sensitivity and high gain at a pair of design frequencies, with the antenna nodes being connected to a mixer semiconductor.

It is therefore an object of the invention to provide an interrogator system generating at least two interrogation frequencies, and being operably associated with a receiver detecting a regenerated information signal at a different frequency.

It is also an object of the invention to provide a RF-ID transponder system which receives at least two interrogation waves, and regenerates a wave from the at least two interrogation waves, having a different frequency than said interrogation waves and bearing an information signal.

These and other objects will be apparent from a review of the drawings and detailed description of the preferred embodiments.

DESCRIPTION OF THE DRAWINGS AND APPENDICES

FIG. 1 is a block diagram of a passive interrogator label system according to the present invention;

FIGS. 2A and 2B are block diagrams of embodiments of transponders having multi-parameter transfer functions according to the present invention, having one and two antennas, respectively:

DETAILED DESCRIPTION OF THE PREFERRED EMBODIMENTS

Figure 2B:
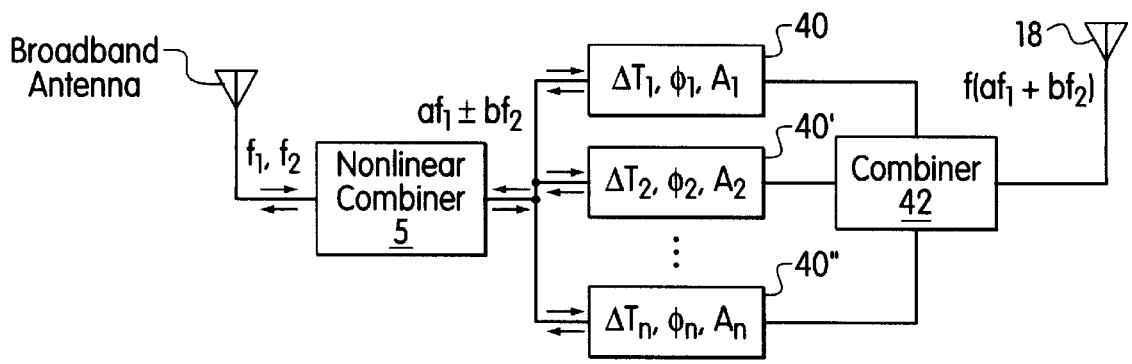

The preferred embodiments of the present invention will now be described with reference to FIGS. 1–4 of the drawings. Identical elements in the various figures are designated with the same reference numerals.

EXAMPLE 1
Acoustic Wave Transponder System

The surface acoustic wave passive interrogator label system, is similar to that described, for example, in U.S. Pat. Nos. 4,734,698; 4,737,790; 4,703,327; and 4,951,057, expressly incorporated herein by reference. A significant difference is that the interrogator transmits a pair of excitation frequencies which do not include 915 MHz or a subharmonic thereof, and which, when mixed, have a component at 915 MHz. Likewise, the passive label includes a mixer device to generate a 915 MHz component from the excitation frequencies of the interrogation wave.

The surface acoustic wave passive interrogator label system includes an interrogator comprising a frequency synthesizer 10 which produces a signal at a desired frequency determined by a control input supplied by a control unit 12. This frequency is controlled, for example, to form a chirp, sweeping a range of about 5–25 MHz every 16 mS. The synthesizer 10 output signal is then mixed in a mixer 1 with a fixed 2450 MHz signal from signal source 2, resulting in a chirp signal at 2455–2475 MHz, which is then filtered and amplified by a power amplifier 14 and applied to an antenna 16 for transmission to a transponder 20. The frequency synthesizer 10 may be constructed of various oscillator types, such as VCO, DCO and DDS. A second fixed radio frequency signal source 4 produces a 5800 MHz signal, which is amplified in power amplifier 14' emitted by antenna 16'. Together, the 2455–2475 MHz and 5800 MHz signals comprise the interrogation signal S1. The power amplifiers 14, 14' and antennas 16, 16' may be a single structure, so long as the system has sufficient bandwidth and low distortion to prevent emission of an undesired 915 MHz band signal.

The signal S1 is received at a broadband antenna 18 of the transponder 20, and mixed by mixer 5, which, for example, a Schottky diode or GaAs device, to produce a 915 MHz component, and passed to a signal transformer 22. This signal transformer 22 converts the first (interrogation) signal S1 into a second (reply) signal S2, encoded with an information pattern. See, U.S. Pat. Nos. 4,734,698 4,737,790, and 4,703,327, expressly incorporated herein by reference. The information pattern is encoded by generating surface acoustic waves traveling through a set of paths, represented by signal conditioning elements 40, 40', 40" in FIGS. 2A and 2B having characteristic delay periods $T_0$ and $\Delta T_1, \Delta T_2, \ldots \Delta T_N$. The signal S2 is passed either to the same antenna 18 (or to a different antenna) for transmission back to the interrogator/receiver apparatus. This second signal S2 carries encoded information which identifies the particular transponder 20. Since the operational frequency of the transponders is different from the frequency of the interrogation wave, the transducers within the transponder may also be set to operate at their resonant frequency, for example 305 MHz, by setting a difference between emitted signals of about 305 MHz. This provides greater power efficiency. See Example 2. When compared with prior art acoustic transponders, the present system has increased reactive impedance in the antenna-mixer structures due to the mixer diode 5. Therefore, the surface acoustic wave transducers may be optimized to match the effective impedance seen under these circumstances, such as being provided in parallel rather than in series.

The signal S2 is picked up by a receiving antenna 26, and filtered by bandpass filter 27. Both this second signal S2 and the first signal S1, or more particularly the output of a summer 7 of the components of S1 are applied to a mixer (four quadrant multiplier) 30 to produce a third signal S3 containing frequencies which include both the sums and the differences of the frequencies contained in the signals S1 and S2. The signal S3 is passed to a signal processor 32 which determines the amplitude $a_i$ and the respective phase $\phi_i$ of each frequency component $\phi_i$ among a set of frequency components ($\phi_0, \phi_1, \phi_2 \ldots$) in the signal S3. Each phase $\phi_i$ is determined with respect to the phase $\phi_0=0$ of the lowest frequency component $\phi_0$. The signal S3 may be intermittently supplied to the mixer by means of a switch, and indeed the signal processor may be time-division multiplexed to handle a plurality of S3 signals from different antennas.

The information determined by the signal processor may be processed conventionally, for example by a computer system comprising, among other elements, a random access memory (RAM) and a microprocessor. This computer system analyzes the frequency, amplitude and phase information and makes decisions based upon this information. For example, the computer system may determine the identification number of the interrogated transponder 20. This I.D number and/or other decoded information is made available at an output 38.

The transponder serves as a signal transforming element 22, which comprises N+1 signal conditioning elements 40 and a signal combining element 42. The signal conditioning elements 40 are selectively provided to impart a different response code for different transponders, and which may involve separate intermediate signals $I_0, I_1 \ldots I_N$ within the transponder. Each signal conditioning element 40 comprises a known delay $T_i$ and a known amplitude modification $A_i$ (either attenuation or amplification). The respective delay $T_i$ and amplitude modification $A_i$ may be functions of the frequency of the received signal S1, or they may provide a constant delay and constant amplitude modification, respectively, independent of frequency. The time delay and amplitude modification may also have differing dependency on frequency. The order of the delay and amplitude modification elements may be reversed; that is, the amplitude modification elements $A_i$ may precede the delay elements $T_i$. Amplitude modification $A_i$ can also occur within the path $T_i$. The signals are combined in combining element 42 which combines these intermediate signals (e.g., by addition, multiplication or the like) to form the reply signal S2 and the combined signal emitted by the antenna 18, as shown in FIG. 2B.

The transponder may also be folded, with the signal received and transmitted through the same structures, with an intermediate modification, as shown in FIG. 2A.

Figure 3A:
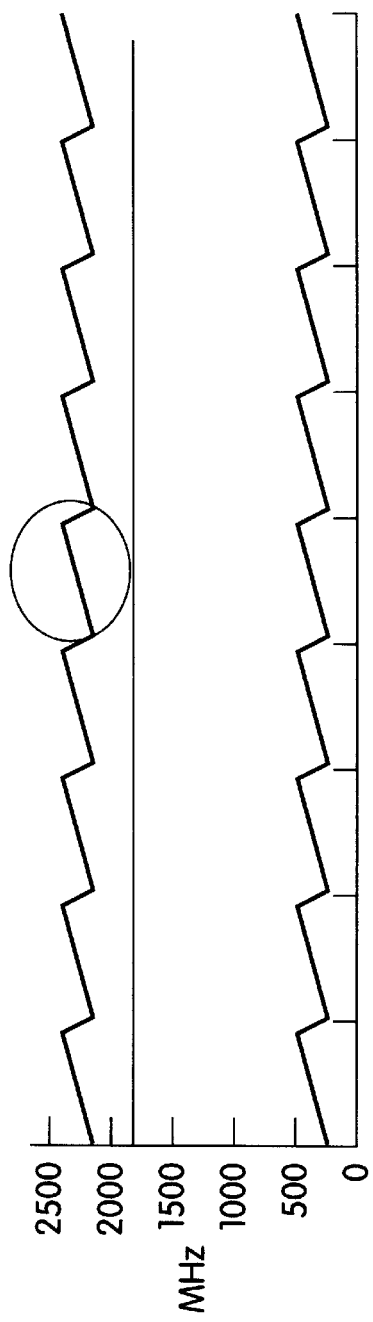
FIGS. 3A and 3B are time diagrams, drawn to different scales, of the radio frequencies contained in the interrogation and reply signals transmitted with the system of FIG. 1.
Figure 3B:
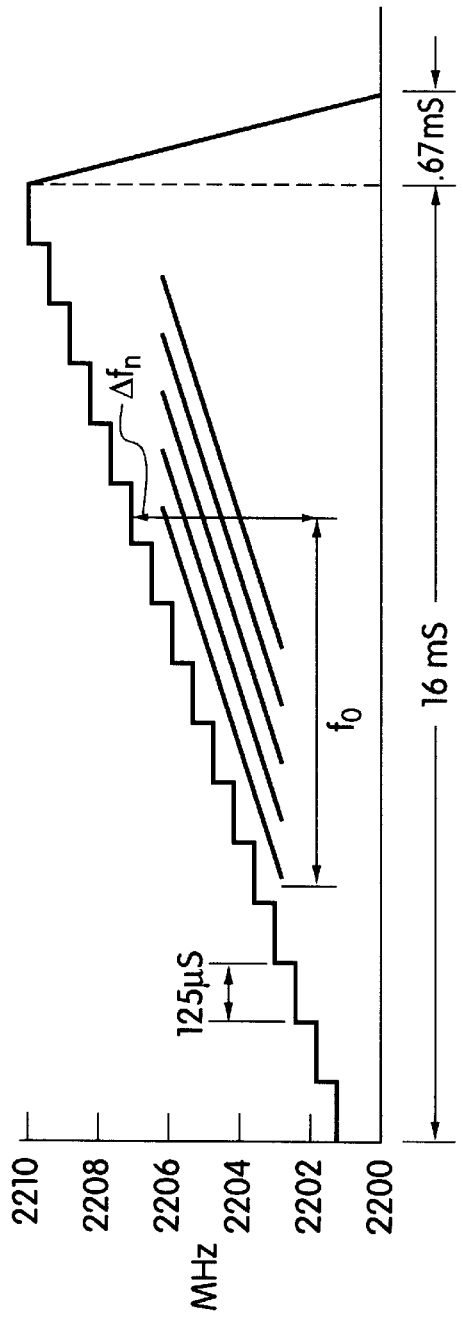

In one embodiment, the frequency synthesizer 10 is controlled to produce a sinusoidal RF signal output with a frequency that is swept in 128 equal discrete steps from 5 MHz to 25 MHz, in a pattern as shown in FIGS. 3A and 3B. Each frequency step is maintained for a period of 125 microseconds so that the entire frequency sweep is carried out in 16 milliseconds. Thereafter, the frequency is dropped back to 5 MHz in a relaxation period of 0.67 milliseconds. The stepwise frequency sweep approximates a linear sweep. Assuming that the stepwise frequency sweep approximates an average, linear frequency sweep or "chirp", the transponder 20, with its known, discrete time delays $T_0, T_1 \ldots T_N$ produces the second (reply) signal S2 with distinct differences in frequency components from the mixed first (interrogation) signal S1, due to the delays within the transponder and non-stationary excitation signal S1. Assuming a round-trip, radiation transmission time of $t_0$, the total round-trip times between the moment of transmission of the first signal and the moments of reply of the second signal will be $t_0+T_0, t_0+T_1, \ldots t_0+T_N$, for the delays $T_{0N}, T \ldots, T_1$ respectively. Considering only the transponder delay $T_N$, at the time $t_R$ when the second (reply) signal is received at the antenna 26, the mixed frequency of this second signal will be $\Delta f_N$ less than the instantaneous mixed frequency resulting from the first signal S1 transmitted by the antenna 16. Thus, if the first and second signals are mixed or "homodyned", this frequency difference $\Delta f_N$ will appear in the third signal as a beat frequency. Understandably, other beat frequencies will also result from the other delayed frequency spectra 49 resulting from the time delays $T_0, T_1 \ldots T_{N-1}$. Thus, in the case of a "chirp" waveform, the difference between the emitted and received waveform will generally be constant. In mathematical terms, we assume that the phase of a transmitted interrogation signal is $\phi=2\pi f\tau$, where $\tau$ is the round-trip transmission time delay. For a ramped frequency df/dt or f, we have: $2\pi f\tau = d\phi/dt = \omega$. $\omega$, the beat frequency, is thus determined by $\tau$ for a given ramped frequency or chirp f.

Alternately, a heterodyne-type receiver may be implemented, mixing one of the pair of interrogation waves with the received signal to generate an intermediate frequency, and then downconverting using the other of the pair of interrogation waves to baseband.

In either case, case, the signal S3 may be analyzed, in known manner, by determining a frequency content of the S3 signal, for example by applying it to sixteen bandpass filters, each tuned to a different frequency, $f_0, f_1 \ldots f_E, f_F$. The signal processor determines the amplitude and phase of the signals that pass through these respective filters. These amplitudes and phases contain the code or "signature" of the particular signal transformer 22 of the interrogated transponder 20. This signature may be analyzed and decoded in known manner.

The transponder device may also include a separate filter structures (not shown) to attenuate undesired components of the interrogation signal, i.e., the high frequency components.

However, typically, no additional structures are necessary, as these components are non-interfering, and are attenuated by the existing structures, including transducers, reflectors, roughness and serration of edges, and the like.

EXAMPLE 2

Acoustic Wave Transponder Tag

Figure 4:
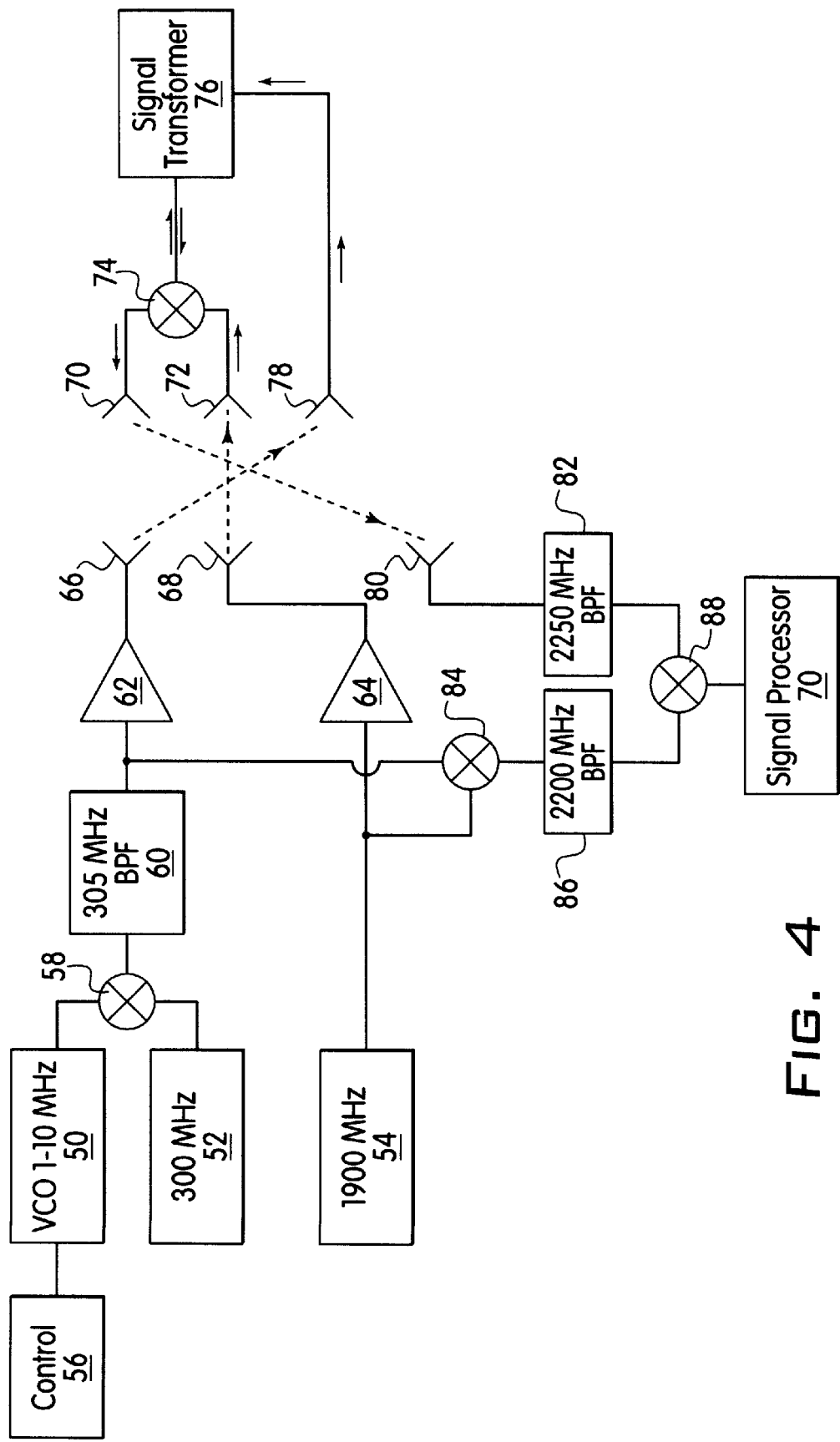
FIG. 4 is a block diagram illustrating the a frequency mixing transponder interrogation system according to the present invention.

A system is provided similar to that described in Example 1. However, the tag is provided with an antenna system comprising two antennas, as shown in FIG. 4 and shown representatively in FIG. 2D. The interrogation signals include a 305 MHz signal which is provided with a chirp waveform, having frequencies from 301.6 MHz to 308.3 MHz, formed by mixing a VCO 50 output with a 300 MHz signal generator 52 with mixer 58, filtered by bandpass filter 60, and a 1900 MHz signal generator 54 output, produced by a system similar to that described in Example 1. Two antennas 70, 72 are tuned for high gain at about 305 MHz (low frequency) and about 1900–2205 MHz, (high frequency) respectively, and receive the interrogation signals from the transmit antennas 62, 64 from the amplifiers 62, 64. The received 305 MHz component is fed to an acoustic wave modifying device as the signal transformer 76, and modified by the action thereof. In this device, the modified wave output is directed to a different set of interdigital transducers than the input. The modified 305 MHz component is then mixed with the 1900 MHz signal in a mixer 74, to produce a 2205 MHz, which is then emitted by a high frequency antenna 70, which may be the same as the antenna 72 which receives the 1900 MHz signal. The emitted signal is then received by antenna 80, filtered by a 2200 MHz bandpass filter, and homodyned in mixer 88 with a representation of the bandpass filtered 86 mixer 84 output of the interrogation signals. Signal processor 90 analyzes the resulting baseband signals similarly to the embodiment of Example 1. Thus it is seen that the waves may be mixed before or after modification.

The 305 MHz low frequency antenna 78 is coupled to the surface acoustic wave interdigital transducer leads. In this case, since the reactive impedance of the 305 MHz antenna is higher than that of a 915 MHz antenna, it is not necessary to provide series transducer structures for impedance matching. The output interdigital transducer preferably matches the impedance presented by the mixer, and the 1900 MHz and 2200 MHz high frequency antennas 70, 72, which is relatively low as compared to the interdigital transducer. Therefore, the output interdigital transducer may be provided as a series coupled structure.

EXAMPLE 3

Active Transponder

Typical semiconductor memory active tag system are described in U.S. Pat. Nos. 4,739,328; 4,782,345; 4,888,591; 5,030,807; 4,999,636; 5 479,160; 3,914,762; 5,485,520; 4,123,754; 5,086,389; 5,310,999; 4,864,158; 4,853,705; 4,816,839; 5,055,659; 4,835,377; 4,912,471; 4,358,765; 4,075,632; and 3,984,835 incorporated herein by reference.

U.S. Pat. No. 4,739,328, expressly incorporated herein by reference, provides a system which interrogates an active semiconductor memory tag. The system produces pluralities of cycles of FSK modulation signals at first and second respective harmonic frequencies, modulated onto a mixed frequency derived from the interrogation waves.

Figure 2C:
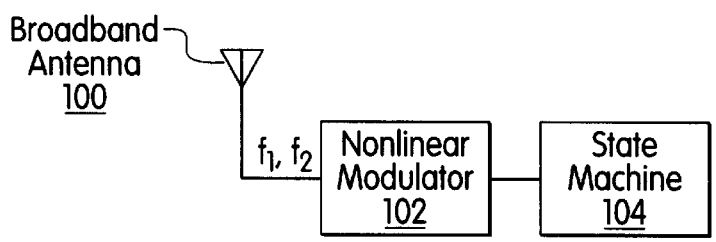
FIGS. 2C and 2D are block diagrams of embodiments of transponders having state machine modulators according to the present invention, having one and three antennas, respectively.

In semiconductor modulator-based systems, as shown in FIG. 2C, the GaAs MESFET or semiconductor modulator structure 102 which is both a wave modifying device and nonlinear combiner, which modulates the antenna 100 impedance and thus modulates the backscatter signal, based on a state machine 104 output, may also serve as the mixer according to the present invention, to non-linearly mix the received frequencies and generate the sum and/or difference frequencies with reasonable efficiency. Thus, no additional structures are necessary in the transponder. However, the system typically will differ somewhat from known RF-ID semiconductor memory transponders because the antenna will have a broad band reception characteristics allowing it to receive the interrogation signals, e.g., about 2450 MHz and 5800 MHz, and emit a reply including a component at about 900 MHz. Further, in these systems, the frequency of operation is not as critical as in passive acoustic devices, so that increased flexibility in selection of frequencies is maintained. In particular, there is no need for the backscatter signal to be at or near 900 MHz, as this frequency is non-critical. In an alternate embodiment, the semiconductor mixer may also be optimized for mixing with high efficiency, and thus may be a separate structure from the modulating semiconductor.

The transponder includes a state machine 104, which includes a data source such as a read-only memory which provides a sequence of binary 1's and binary 0's in an individual pattern. A binary "1" in the read-only memory causes a modulator 102 to produce a first plurality of signal cycles and a binary "0" in the read-only memory causes the modulator 102 to produce a second plurality of signal cycles different and distinguishable from the first plurality of signals. The pluralities of signal cycles sequentially produced by the modulator 102 to represent the pattern of binary 1's and binary 0's identifying the object are introduced to the gate of a semiconductor device, e.g., a GaAs MESFET, which, in turn, modulates the impedance of the dipole antenna 100, communicating information for transmission to the reader. The GaAs MESFET structure, in the "on" state, is biased to operate at a substantially non-linear operating point, and thus non-linearly mixes the frequency components of the signal components received by the antenna 100. If desired, a different type of modulating semiconductor, e.g., a SiGe heterobipolar transistor, Schottky diode or a GaAs diode may be provided within the structure to enhance mixing efficiency.

The receiver for this transponder system is shown as shown in FIG. 1, although the signal processor 32 is of a different type than that described in Example 1. The signal processer therefore produces signals in a sequence having a pattern identifying the pattern of 1's and 0's in the read-only memory at the transponder.

Figure 2D:
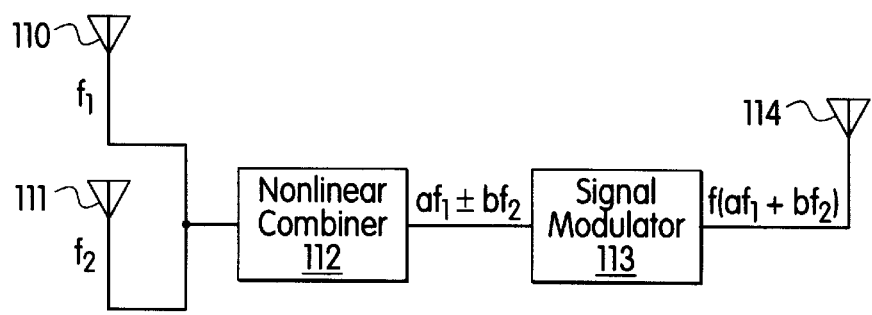

As shown in FIG. 2D, another embodiment of a transponder tag provides antenna 110 which receives a wave having frequency f1, and antenna 111 which receives a wave having frequency f2. A nonlinear combiner 112 generates a mixed wave having, in addition to signal components f1 and f2, signal components af1±bf2, which is subject to modulation in signal modulator 113, to produce a wave having a component f(af1±bf2), representing a static or dynamic function of the mixed wave. This component is then reradiated through antenna 114.

There has thus been shown and described a novel RF-ID tag interrogation system, which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A transponder device, receiving a plurality of waves having differing frequencies, and producing a modified wave therefrom, having a frequency differing from each of the plurality of received waves, and having characteristic distinguishing modifications, said device comprising:
    a mixer, receiving a plurality of waves and producing therefrom a mixed wave having a frequency differing from the plurality of waves;
    a wave modifying device, operating to characteristically modify a wave by one or more methods selected from the group consisting of sequentially modulating the wave with a plurality of modulation states and modulating the wave according to a transfer function having a plurality of distinct parameters;
    said wave modifying device and said mixer in combination forming a network for producing a wave derived from the received plurality of waves, which is both characteristically modified by said wave modifying device and having a frequency of the mixed wave, said network being arranged with either said characteristically modified wave being one or more of the plurality of waves received by said mixer, or the characteristically modified wave being received derived from the mixed wave from said mixer, or both; and
    an output, for emitting the characteristically modified wave externally from said transponder device.

2. The transponder device according to claim 1, wherein said network is arranged such that said wave modifying device receives the mixed wave from said mixer.

3. The transponder device according to claim 1, wherein said network is arranged such that said wave modifying device receives one or more of the plurality of received waves, said mixer receiving the characteristically modified wave from said wave modifying device.

4. The transponder device according to claim 1, further comprising an antenna system, receiving the plurality of waves as electromagnetic waves in space.

5. The transponder device according to claim 4, wherein said antenna system comprises an antenna element adapted to receive at least two of the plurality of waves.

6. The transponder device according to claim 4, wherein said antenna system comprises at least two antenna elements, each being adapted to receive a different frequency component of the plurality of waves.

7. The transponder device according to claim 1, wherein said mixer comprises a semiconductor.

8. The transponder device according to claim 7, wherein said semiconductor device comprises a two terminal device.

9. The transponder device according to claim 7, wherein said semiconductor device comprises a device having at least three terminals.

10. The transponder device according to claim 1, wherein said wave modifying device comprises an electroacoustic transducer.

11. The transducer device according to claim 1, wherein said wave modifying device comprises a semiconductor modulator.

12. The transducer device according to claim 1, wherein said wave modifying device comprises a control input, controlling a transimpedance of a semiconductor modulator and said mixer comprises a conduction channel of said semiconductor modulator.

13. The transducer device according to claim 1, wherein the wave which is both characteristically modified and at a frequency of the mixed wave is emitted through a common antenna element which also receives at least one of the plurality of received waves.

14. The transponder device according to claim 1, wherein said transponder device is adapted to receive and modify the plurality of waves and wherein at least one of the plurality of received waves has a frequency which varies over time.

15. A communication method, comprising the steps of:
    providing a transponder device, for receiving a plurality of waves having differing frequencies, and producing a wave derived therefrom, having a frequency differing from each of the plurality of received waves and having characteristic modifications, the transponder device having an antenna system for receiving the plurality of waves having differing frequencies and emitting the wave, having a frequency differing from the plurality of received waves and having characteristic modifications:
    exciting the transponder device with a plurality of waves having differing frequencies;
    producing a wave in the transponder device having characteristic modifications and a frequency differing from each of the plurality of received waves by one or more methods selected from the group consisting of sequentially modulating the wave with a plurality of modulation states and modulating the wave according to a transfer function having a plurality of distinct parameters; and
    detecting the wave, having a frequency differing from the plurality of received waves, and having characteristic modifications.

16. The method according to claim 15, wherein the transponder device comprises a mixer and a wave modifying device.

17. The method according to claim 16, further comprising the steps of mixing the plurality of waves received by the antenna system in a mixer and modifying the mixed plurality of received waves in a wave modifying device.

18. The method according to claim 16, further comprising the steps of characteristically modifying at least one of the plurality of received waves with a wave modifying device and mixing the characteristically modified wave with at least one of the plurality of received waves in a mixer.

19. The method according to claim 15, further comprising the step of receiving at least two of the plurality of waves with a single antenna element.

20. The method according to claim 15, further comprising the step of receiving at least one of the plurality of waves with each of at least two different antenna elements, each respective antenna element being adapted to receive at least one different frequency wave.

21. The method according to claim 16, wherein the frequency differing from each of the plurality of received waves is produced by a semiconductor mixer.

22. The method according to claim 15, further comprising the step of producing a wave, having a frequency differing from the plurality of received waves, by passing at least two of the plurality of received waves through a nonlinear conductance device.

23. The method according to claim 15, further comprising the step of producing a wave, having a frequency differing from the plurality of received waves, by modulating a transconductance of a semiconductor device conducting a wave having a first frequency with a wave having a second frequency.

24. The method according to claim 16, further comprising the step of acoustically transducing at least one wave for characteristic modification thereof.

25. The method according to claim 15, further comprising the step of characteristically modifying a wave with a semiconductor modulator.

26. The method according to claim 15, wherein the step of producing a wave in the transponder device having characteristic modifications, comprises passing a plurality of waves through a semiconductor device having a control input, a transimpedance of a conduction channel being controlled to provide characteristic modifications thereof and the differing frequency wave being generated by a nonlinear conduction characteristic of the conduction channel of the semiconductor device conducting waves having at least two different frequencies.

27. The method according to claim 15, further comprising the step of emitting the characteristically modified wave having a frequency differing from the plurality of received waves through a common antenna element which also receives at least one of the plurality of received waves.

28. The method according to claim 15, wherein said transponder device is adapted to receive a plurality of waves, at least one of which varies in frequency over time and to produce a wave which is characteristically modified, further comprising the step of varying a frequency of at least one of the received waves over time.

29. The method according to claim 15, further comprising the steps of:

emitting the plurality of waves having differing frequencies with an interrogator system into an interrogation region, said detecting step comprising:

receiving the wave having a frequency differing from the plurality of received waves, and having characteristic modifications from the interrogation region; and analyzing the received wave to extract characteristic information identifying the respective transponder.

30. The method according to claim 29, wherein the wave having a frequency differing from the plurality of received waves is within the 900 MHz 1SM band.

31. The method according to claim 29, wherein at least one of the plurality of waves has a non-stationary frequency, and wherein the plurality of waves, when mixed together, produce a significant signal component in the 900 MHz frequency band having a non-stationary frequency.

32. The method according to claim 29, wherein the wave having a frequency differing from the plurality of received waves is a 900 MHz band signal component having a non-stationary frequency.

33. The method according to claim 29, wherein said analyzing step analyzes wave having a frequency differing from the plurality of received waves for characteristic delay encoding patterns.

34. A transponder device, receiving a plurality of radio frequency waves having differing frequencies, and producing a modified wave derived therefrom, having a frequency differing from each of the plurality of received waves, and having characteristic modifications capable of being distinguished from waves of the same frequency having differing characteristic modifications, said device comprising:

an antenna system for receiving the plurality of radio frequency waves and transmitting the modified wave;

a mixer, receiving a plurality of waves from said antenna system and producing a mixed wave having a frequency differing from the received plurality of waves;

a wave modifying device, receiving the mixed wave from said mixer and producing the modified wave derived therefrom, having a transfer function selected from one or more of the group consisting of a characteristic set of identifying transfer function coefficients and a characteristic time sequence of identifying symbols, the modified wave being returned to said antenna system for transmission.

35. The transponder device according to claim 34, wherein said wave modifying device returns the modified wave to said antenna system through said mixer.

36. The transponder device according to claim 34, wherein said transfer function is a characteristic set of identifying delay coefficients.

37. The transponder device according to claim 34, wherein said transfer function is a characteristic time sequence of identifying symbols.

* * * * *